United States Patent
Furukawa et al.

(10) Patent No.: US 9,524,831 B2
(45) Date of Patent: Dec. 20, 2016

(54) METHOD FOR PRODUCING HYBRID NEGATIVE PLATE FOR LEAD-ACID STORAGE BATTERY AND LEAD-ACID STORAGE BATTERY

(75) Inventors: Jun Furukawa, Iwaki (JP); Daisuke Momma, Iwaki (JP); Toshimichi Takada, Iwaki (JP); Yuichi Akasaka, Iwaki (JP); Satoshi Shibata, Iwaki (JP); Lan Trieu Lam, Springvale (AU); Rosalie Louey, Donvale (AU); Nigel Peter Haigh, Wallan (AU)

(73) Assignees: THE FURUKAWA BATTERY CO., LTD., Yokohama (JP); COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 0 days.

(21) Appl. No.: 13/392,651

(22) PCT Filed: Aug. 26, 2010

(86) PCT No.: PCT/JP2010/064985
§ 371 (c)(1),
(2), (4) Date: Jun. 18, 2012

(87) PCT Pub. No.: WO2011/025058
PCT Pub. Date: Mar. 3, 2011

(65) Prior Publication Data
US 2012/0263977 A1   Oct. 18, 2012

(30) Foreign Application Priority Data
Aug. 27, 2009  (JP) .................... 2009-196200

(51) Int. Cl.
| H01M 6/00 | (2006.01) |
| H01G 11/86 | (2013.01) |
| H01G 11/38 | (2013.01) |
| H01G 11/42 | (2013.01) |
| H01M 4/20 | (2006.01) |
| H01M 4/62 | (2006.01) |
| H01M 4/04 | (2006.01) |
| H01M 4/36 | (2006.01) |

(52) U.S. Cl.
CPC .............. *H01G 11/86* (2013.01); *H01G 11/38* (2013.01); *H01G 11/42* (2013.01); *H01M 4/043* (2013.01); *H01M 4/0411* (2013.01); *H01M 4/20* (2013.01); *H01M 4/366* (2013.01); *H01M 4/625* (2013.01); *H01M 4/627* (2013.01); *Y02E 60/126* (2013.01); *Y02E 60/13* (2013.01); *Y02P 70/54* (2015.11); *Y02T 10/7022* (2013.01)

(58) Field of Classification Search
CPC .......... H01G 11/38; H01G 11/42; H01G 11/86; H01M 4/20; H01M 4/625; H01M 4/0411; H01M 4/043; H01M 4/366; H01M 4/627; Y02E 60/126; Y02E 60/128; Y02E 60/13; Y02T 10/7016; Y02T 10/7022
USPC ....................................... 429/7, 122
See application file for complete search history.

(56) References Cited

U.S. PATENT DOCUMENTS

| 2,938,063 A | 5/1960 | Greenburg et al. |
| 3,881,954 A * | 5/1975 | Maskalick ............. H01M 4/16 205/63 |
| 4,215,190 A | 7/1980 | Ferrando et al. |
| 4,422,987 A | 12/1983 | Arimatsu |
| 4,507,372 A | 3/1985 | Rowlette |
| 4,567,284 A | 1/1986 | Monzyk et al. |
| 4,576,879 A | 3/1986 | Nakazawa et al. |
| 4,770,954 A | 9/1988 | Noordenbos |
| 4,882,132 A | 11/1989 | Monzyk et al. |
| 4,975,253 A | 12/1990 | Monzyk et al. |
| 5,069,990 A | 12/1991 | Yoshimura et al. |
| 5,077,151 A | 12/1991 | Yasuda et al. |
| 5,154,989 A | 10/1992 | Howard et al. |
| 5,252,105 A | 10/1993 | Witherspoon et al. |

(Continued)

FOREIGN PATENT DOCUMENTS

| CN | 1357899 | 7/2002 |
| CN | 101079510 | 11/2007 |

(Continued)

OTHER PUBLICATIONS

International Search Report for PCT/JP2010/064985, mailed Nov. 30, 2010.

(Continued)

*Primary Examiner* — Gary Harris
(74) *Attorney, Agent, or Firm* — Nixon & Vanderhye P.C.

(57) ABSTRACT

There is provided a method for producing a hybrid negative plate for a lead-acid storage battery which is improved in the production working efficiency and the productivity and enhances the quick charge and discharge characteristics and the discharge characteristics at a low temperature under PSOC of a lead-acid storage battery.

A carbon mixture sheet produced by such a way that a carbon mixture prepared by mixing two types of carbon materials consisting of a first carbon material having electroconductivity and a second carbon material having capacitor capacitance and/or pseudocapacitor capacitance, and at least a binder, is adhered by pressure to the surface of a negative plate in a wet state, so that a hybrid negative plate is produced. The lead-acid storage battery provided with the hybrid negative plate is improved in the discharge characteristics.

20 Claims, No Drawings

(56) References Cited

U.S. PATENT DOCUMENTS

| | | |
|---|---|---|
| 5,260,855 A | 11/1993 | Kaschmitter et al. |
| 5,384,685 A | 1/1995 | Tong et al. |
| 5,393,617 A | 2/1995 | Klein |
| 5,419,977 A | 5/1995 | Weiss et al. |
| 5,429,893 A | 7/1995 | Thomas |
| 5,439,756 A | 8/1995 | Anani et al. |
| 5,455,999 A | 10/1995 | Weiss et al. |
| 5,458,043 A | 10/1995 | Jensen et al. |
| 5,464,453 A | 11/1995 | Tong et al. |
| 5,491,399 A | 2/1996 | Gregory et al. |
| 5,518,833 A | 5/1996 | Repplinger et al. |
| 5,526,223 A | 6/1996 | Wu et al. |
| 5,529,971 A | 6/1996 | Kaschmitter et al. |
| 5,534,369 A | 7/1996 | Nagaura |
| 5,547,783 A | 8/1996 | Funato et al. |
| 5,574,353 A | 11/1996 | Bai et al. |
| 5,587,250 A | 12/1996 | Thomas et al. |
| 5,604,426 A | 2/1997 | Okamura et al. |
| 5,626,729 A | 5/1997 | Thompson et al. |
| 5,670,266 A | 9/1997 | Thomas et al. |
| 5,705,259 A | 1/1998 | Mrotek et al. |
| 5,744,258 A | 4/1998 | Bai et al. |
| 5,781,403 A | 7/1998 | Aoki et al. |
| 5,789,338 A | 8/1998 | Kaschmitter et al. |
| 5,821,006 A | 10/1998 | Patel et al. |
| 5,821,007 A | 10/1998 | Harshe et al. |
| 5,849,426 A | 12/1998 | Thomas et al. |
| 5,916,699 A | 6/1999 | Thomas et al. |
| 5,935,724 A | 8/1999 | Spillman et al. |
| 5,935,728 A | 8/1999 | Spillman et al. |
| 5,960,898 A | 10/1999 | Okada et al. |
| 5,993,983 A | 11/1999 | Rozon |
| 6,005,764 A | 12/1999 | Anderson et al. |
| 6,011,379 A | 1/2000 | Singh et al. |
| 6,072,691 A | 6/2000 | Suhara et al. |
| 6,087,812 A | 7/2000 | Thomas et al. |
| 6,088,217 A | 7/2000 | Patel et al. |
| 6,117,585 A | 9/2000 | Anani et al. |
| 6,190,805 B1 | 2/2001 | Takeuchi et al. |
| 6,195,252 B1 | 2/2001 | Belyakov et al. |
| 6,208,502 B1 | 3/2001 | Hudis et al. |
| 6,208,878 B1 | 3/2001 | Hattori et al. |
| 6,222,723 B1 | 4/2001 | Razoumov et al. |
| 6,252,762 B1 | 6/2001 | Amatucci |
| 6,294,893 B1 | 9/2001 | De Abreu |
| 6,304,467 B1 | 10/2001 | Nebrigic |
| 6,310,789 B1 | 10/2001 | Nebrigic et al. |
| 6,316,563 B2 | 11/2001 | Naijo et al. |
| 6,331,365 B1 | 12/2001 | King |
| 6,333,123 B1 | 12/2001 | Davis et al. |
| 6,466,429 B1 | 10/2002 | Volfkovich et al. |
| 6,509,116 B1 | 1/2003 | Kurosaki et al. |
| 6,509,713 B2 | 1/2003 | De Abreu |
| 6,517,972 B1 | 2/2003 | Amatucci |
| 6,541,140 B1 | 4/2003 | Spillman et al. |
| 6,576,365 B1 | 6/2003 | Meitav et al. |
| 6,585,915 B2 | 7/2003 | Shinozaki et al. |
| 6,610,440 B1 | 8/2003 | LaFollette et al. |
| 6,623,884 B1 | 9/2003 | Spillman et al. |
| 6,628,504 B2 | 9/2003 | Volfkovich et al. |
| 6,631,073 B1 | 10/2003 | Sakata et al. |
| 6,643,151 B1 | 11/2003 | Nebrigic et al. |
| 6,646,415 B1 | 11/2003 | Nebrigic et al. |
| 6,653,014 B2 | 11/2003 | Anderson et al. |
| 6,680,600 B2 | 1/2004 | Emori et al. |
| 6,687,116 B2 | 2/2004 | Hudis |
| 6,706,079 B1 | 3/2004 | Shmatko et al. |
| 6,737,822 B2 | 5/2004 | King |
| 6,749,963 B2 | 6/2004 | Kurosaki et al. |
| 6,765,363 B2 | 7/2004 | LaFollette et al. |
| 6,869,731 B2 | 3/2005 | Nobuta et al. |
| 6,887,617 B2 | 5/2005 | Sato et al. |
| 6,911,273 B2 | 6/2005 | Faris |
| 7,006,346 B2 | 2/2006 | Volfkovich et al. |
| 7,035,084 B2 | 4/2006 | Kaneko et al. |
| 7,049,792 B2 | 5/2006 | King |
| 7,057,880 B2 | 6/2006 | Kurosaki et al. |
| 7,074,688 B2 | 7/2006 | Kurihara et al. |
| 7,083,876 B2 | 8/2006 | Honbo et al. |
| 7,110,242 B2 | 9/2006 | Adrianov et al. |
| 7,119,047 B1 | 10/2006 | Adrianov et al. |
| 7,144,654 B2 | 12/2006 | LaFollette et al. |
| 7,166,384 B2 | 1/2007 | LaFollette et al. |
| 7,186,473 B2 | 3/2007 | Shiue et al. |
| 7,358,008 B2 | 4/2008 | Nanno et al. |
| 7,397,650 B2 | 7/2008 | Sato et al. |
| 7,420,295 B2 | 9/2008 | Omae et al. |
| 7,462,419 B2 | 12/2008 | LaFollette et al. |
| 7,468,221 B2 | 12/2008 | LaFollette et al. |
| 7,649,335 B2 | 1/2010 | Ishikawa et al. |
| 7,742,279 B2 | 6/2010 | Takahashi et al. |
| 7,862,931 B2 | 1/2011 | Furukawa et al. |
| 7,923,151 B2 | 4/2011 | Lam et al. |
| 8,017,273 B2 | 9/2011 | Lara-Curzio et al. |
| 8,057,937 B2 | 11/2011 | Sung et al. |
| 2001/0009734 A1* | 7/2001 | Clough ............... H01M 2/16 429/57 |
| 2001/0011119 A1 | 8/2001 | Naijo et al. |
| 2001/0033501 A1 | 10/2001 | Nebrigic |
| 2001/0044045 A1 | 11/2001 | Sato et al. |
| 2002/0036478 A1 | 3/2002 | De Abreu |
| 2002/0037452 A1 | 3/2002 | Schmidt |
| 2002/0058185 A1 | 5/2002 | Kurosaki et al. |
| 2002/0096661 A1 | 7/2002 | Shinozaki et al. |
| 2002/0132164 A1 | 9/2002 | Kaneko et al. |
| 2002/0155327 A1 | 10/2002 | Faris |
| 2002/0158606 A1 | 10/2002 | King |
| 2002/0161146 A1 | 10/2002 | Naijo et al. |
| 2002/0163771 A1 | 11/2002 | Volfkovich et al. |
| 2002/0176221 A1 | 11/2002 | Hudis |
| 2002/0182485 A1 | 12/2002 | Anderson et al. |
| 2002/0196597 A1 | 12/2002 | Volfkovich et al. |
| 2003/0006737 A1 | 1/2003 | LaFollette et al. |
| 2003/0007317 A1 | 1/2003 | Hudis |
| 2003/0008212 A1 | 1/2003 | Akashi et al. |
| 2003/0011964 A1 | 1/2003 | Hudis |
| 2003/0035982 A1 | 2/2003 | Ryu et al. |
| 2003/0049528 A1 | 3/2003 | Honbo |
| 2003/0070916 A1 | 4/2003 | Nanno et al. |
| 2003/0091905 A1 | 5/2003 | Nobuta et al. |
| 2003/0094923 A1 | 5/2003 | Emori et al. |
| 2003/0129458 A1 | 7/2003 | Bailey |
| 2003/0152815 A1 | 8/2003 | LaFollette et al. |
| 2003/0188901 A1 | 10/2003 | Ovshinsky et al. |
| 2003/0219653 A1 | 11/2003 | Kelley et al. |
| 2003/0232238 A1 | 12/2003 | Fleming et al. |
| 2004/0009161 A1 | 1/2004 | Escary |
| 2004/0018421 A1 | 1/2004 | LaFollette et al. |
| 2004/0038087 A1 | 2/2004 | Shiue et al. |
| 2004/0053124 A1 | 3/2004 | LaFollette et al. |
| 2004/0057194 A1 | 3/2004 | Hudis |
| 2004/0091777 A1 | 5/2004 | Lam et al. |
| 2004/0112486 A1 | 6/2004 | Aust et al. |
| 2004/0121204 A1 | 6/2004 | Adelman et al. |
| 2004/0141282 A1 | 7/2004 | Hudis |
| 2004/0142243 A1 | 7/2004 | Furukawa et al. |
| 2004/0161640 A1 | 8/2004 | Salot |
| 2004/0189226 A1 | 9/2004 | King |
| 2004/0209165 A1 | 10/2004 | Kurosaki et al. |
| 2004/0246658 A1 | 12/2004 | Adrianov et al. |
| 2005/0002150 A1 | 1/2005 | Volfkovich et al. |
| 2005/0081350 A1 | 4/2005 | Kurihara et al. |
| 2005/0089728 A1 | 4/2005 | Arai et al. |
| 2005/0093380 A1 | 5/2005 | LaFollette et al. |
| 2005/0110457 A1 | 5/2005 | LaFollette et al. |
| 2005/0112420 A1 | 5/2005 | Lai et al. |
| 2005/0147885 A1 | 7/2005 | Sato et al. |
| 2005/0170242 A1 | 8/2005 | Sato et al. |
| 2005/0221191 A1 | 10/2005 | Kondo et al. |
| 2005/0253458 A1 | 11/2005 | Omae et al. |
| 2005/0260497 A1 | 11/2005 | Kumashiro et al. |
| 2006/0038536 A1 | 2/2006 | LaFollette et al. |
| 2006/0115732 A1 | 6/2006 | Zaghib et al. |
| 2006/0172196 A1 | 8/2006 | Fukunaga |

(56) References Cited

U.S. PATENT DOCUMENTS

| | | | |
|---|---|---|---|
| 2006/0223701 A1 | 10/2006 | Adrianov et al. | |
| 2006/0269801 A1 | 11/2006 | Honbo et al. | |
| 2007/0104981 A1* | 5/2007 | Lam et al. | 429/7 |
| 2007/0128472 A1 | 6/2007 | Tierney et al. | |
| 2007/0247787 A1 | 10/2007 | Nakagawa et al. | |
| 2008/0197810 A1 | 8/2008 | Ishikawa et al. | |
| 2008/0199737 A1 | 8/2008 | Kazaryan et al. | |
| 2008/0206638 A1* | 8/2008 | Takahashi et al. | 429/209 |
| 2008/0264291 A1 | 10/2008 | Pike et al. | |
| 2008/0318135 A1 | 12/2008 | Sung et al. | |
| 2009/0059474 A1* | 3/2009 | Zhamu et al. | 361/503 |
| 2009/0272946 A1 | 11/2009 | Lu | |
| 2009/0291360 A1 | 11/2009 | Kim et al. | |
| 2010/0015531 A1 | 1/2010 | Dickinson et al. | |
| 2010/0075210 A1 | 3/2010 | Lee et al. | |
| 2010/0175934 A1 | 7/2010 | Lam et al. | |
| 2010/0203362 A1 | 8/2010 | Lam et al. | |
| 2010/0214722 A1 | 8/2010 | Fujii et al. | |
| 2011/0151286 A1 | 6/2011 | Lam et al. | |
| 2011/0177392 A1 | 7/2011 | Hoshiba | |
| 2012/0094174 A1 | 4/2012 | Furukawa et al. | |
| 2012/0244429 A1 | 9/2012 | Lam et al. | |
| 2012/0258336 A1 | 10/2012 | Jun et al. | |
| 2014/0127565 A1 | 5/2014 | Furukawa et al. | |

FOREIGN PATENT DOCUMENTS

| | | |
|---|---|---|
| CN | 101132065 | 2/2008 |
| CN | 101414691 | 4/2009 |
| EP | 0 354 966 B1 | 1/1989 |
| EP | 0 354 966 A1 | 7/1989 |
| EP | WO89/06865 A1 | 7/1989 |
| EP | 0 555 422 B1 | 2/1992 |
| EP | 0 662 726 A2 | 12/1994 |
| EP | 0 801 834 B1 | 4/1996 |
| EP | 0 934 607 B1 | 9/1997 |
| EP | 0 964 416 A1 | 11/1997 |
| EP | 0 851 445 A2 | 12/1997 |
| EP | 0 851 445 B1 | 12/1997 |
| EP | 0 872 908 A1 | 4/1998 |
| EP | 0 872 908 B1 | 4/1998 |
| EP | 0 893 790 A2 | 7/1998 |
| EP | 0 893 790 B1 | 7/1998 |
| EP | 1 071 148 B1 | 8/1999 |
| EP | 1 115 130 A1 | 8/1999 |
| EP | 1 000 796 A2 | 11/1999 |
| EP | 1 190 480 B1 | 6/2000 |
| EP | 1 071 148 A2 | 7/2000 |
| EP | 1 126 536 A2 | 2/2001 |
| EP | 1 126 536 B1 | 2/2001 |
| EP | 1 179 871 A2 | 8/2001 |
| EP | 1 189 295 A2 | 9/2001 |
| EP | 1 189 295 B1 | 9/2001 |
| EP | 1 251 576 A2 | 4/2002 |
| EP | 1 315 227 A2 | 4/2002 |
| EP | 1 391 961 A1 | 8/2002 |
| EP | 1 391 961 B1 | 8/2002 |
| EP | 1 309 028 A2 | 10/2002 |
| EP | 1 309 028 B1 | 10/2002 |
| EP | 1 418 428 A1 | 11/2002 |
| EP | 1 496 556 A1 | 4/2003 |
| EP | 1 496 556 B1 | 4/2003 |
| EP | 1 541 422 A1 | 7/2003 |
| EP | 1 775 786 A1 | 7/2003 |
| EP | 1 561 105 B1 | 11/2003 |
| EP | 1 783 792 A1 | 7/2004 |
| EP | 1 386 336 B1 | 1/2006 |
| EP | 2 184 796 A1 | 7/2007 |
| FR | 2 692 077 | 12/1993 |
| JP | 59105266 A * | 6/1984 | ............ H01M 4/14 |
| JP | 61-283173 | 12/1986 |
| JP | 62-103976 | 5/1987 |
| JP | 03-129667 | 6/1990 |
| JP | 4061214 | 2/1992 |
| JP | H04-43557 | 2/1992 |
| JP | 4-233170 | 8/1992 |
| JP | 4-294515 | 10/1992 |
| JP | H06-128317 | 5/1994 |
| JP | 09-092272 | 4/1997 |
| JP | H10-021900 | 1/1998 |
| JP | 10-50565 | 2/1998 |
| JP | H10-294135 | 11/1998 |
| JP | H11-097319 | 4/1999 |
| JP | H11-224699 | 8/1999 |
| JP | 2000-1595 | 1/2000 |
| JP | 2000-13915 | 1/2000 |
| JP | 2000-21408 | 1/2000 |
| JP | 2000-77076 | 3/2000 |
| JP | 2000-235858 | 8/2000 |
| JP | 2001-110418 | 4/2001 |
| JP | 2001-126757 | 5/2001 |
| JP | 2001-313237 | 11/2001 |
| JP | 2001-319655 | 11/2001 |
| JP | 2001-332264 | 11/2001 |
| JP | 2001-351688 | 12/2001 |
| JP | 2002-47372 | 2/2002 |
| JP | 2002-50543 | 2/2002 |
| JP | 2002-50544 | 2/2002 |
| JP | 2002-75788 | 3/2002 |
| JP | 2002-118036 | 4/2002 |
| JP | 2002-298853 | 10/2002 |
| JP | 2002-367613 | 12/2002 |
| JP | 2003-51306 | 2/2003 |
| JP | 2003-77458 | 3/2003 |
| JP | 2003-87988 | 3/2003 |
| JP | 2003-132941 | 5/2003 |
| JP | 2003-200739 | 7/2003 |
| JP | 2003-308696 | 10/2003 |
| JP | 2004-47613 | 2/2004 |
| JP | 2004-55240 | 2/2004 |
| JP | 2004-55541 | 2/2004 |
| JP | 2004-134369 | 4/2004 |
| JP | 2004-221523 | 8/2004 |
| JP | 2004-273443 | 9/2004 |
| JP | 2004-355823 | 12/2004 |
| JP | 2005-32938 | 2/2005 |
| JP | 2005-050582 | 2/2005 |
| JP | 2005-50582 | 2/2005 |
| JP | 2005-80470 | 3/2005 |
| JP | 2005-160271 | 6/2005 |
| JP | 2005-183632 | 7/2005 |
| JP | 2005-248653 | 9/2005 |
| JP | 2005-294497 | 10/2005 |
| JP | 2005-327489 | 11/2005 |
| JP | 2005-353652 | 12/2005 |
| JP | 2006-156002 | 6/2006 |
| JP | 2006-252902 | 9/2006 |
| JP | 2006-310628 | 11/2006 |
| JP | 2006-325331 | 11/2006 |
| JP | 2007-12596 | 1/2007 |
| JP | 2007-506230 | 3/2007 |
| JP | 2007-226996 | 9/2007 |
| JP | 2007-280803 | 10/2007 |
| JP | 2008-22605 | 1/2008 |
| JP | 2008-047452 | 2/2008 |
| JP | 2008047452 A * | 2/2008 |
| JP | 2008-146898 | 6/2008 |
| JP | 2008-150270 | 7/2008 |
| JP | 2008-171766 | 7/2008 |
| JP | 2009-104827 | 5/2009 |
| JP | 2009-135056 | 6/2009 |
| JP | 2009-219960 | 10/2009 |
| TW | I268005 | 12/2006 |
| WO | WO 92/11174 | 7/1992 |
| WO | WO93/05541 A1 | 3/1993 |
| WO | WO93/14511 A1 | 7/1993 |
| WO | WO94/07272 A1 | 3/1994 |
| WO | WO95/21466 | 8/1995 |
| WO | WO95/23437 A1 | 8/1995 |
| WO | WO96/11522 | 4/1996 |
| WO | WO 96/12313 | 4/1996 |
| WO | WO96/17361 | 6/1996 |
| WO | WO96/30959 | 10/1996 |
| WO | WO97/12415 | 4/1997 |

(56) References Cited

FOREIGN PATENT DOCUMENTS

| | | |
|---|---|---|
| WO | WO98/08266 | 2/1998 |
| WO | WO98/19357 | 5/1998 |
| WO | WO 98/24100 | 6/1998 |
| WO | WO98/40925 | 9/1998 |
| WO | WO98/40926 A1 | 12/1998 |
| WO | WO98/54816 | 12/1998 |
| WO | WO99/24996 | 5/1999 |
| WO | WO00/02213 | 1/2000 |
| WO | WO00/11688 | 3/2000 |
| WO | WO00/63929 | 10/2000 |
| WO | WO01/01553 A1 | 1/2001 |
| WO | WO01/17054 A1 | 3/2001 |
| WO | WO01/41232 A2 | 6/2001 |
| WO | WO01/95410 A1 | 12/2001 |
| WO | WO02/01655 A2 | 1/2002 |
| WO | WO02/052664 A2 | 7/2002 |
| WO | WO02/087006 | 10/2002 |
| WO | WO02/091412 A1 | 11/2002 |
| WO | WO02/099956 A2 | 12/2002 |
| WO | WO03/036670 A2 | 5/2003 |
| WO | WO03/055791 A2 | 7/2003 |
| WO | WO 03/077333 | 9/2003 |
| WO | WO03/088385 A1 | 10/2003 |
| WO | WO03/094184 A1 | 11/2003 |
| WO | WO03/098648 A1 | 11/2003 |
| WO | WO2004/008560 A2 | 1/2004 |
| WO | WO2004/012964 A1 | 2/2004 |
| WO | WO2004/038051 A1 | 5/2004 |
| WO | WO2004/042394 A2 | 5/2004 |
| WO | WO2005/027255 A1 | 3/2005 |
| WO | WO2005/041343 A1 | 5/2005 |
| WO | WO2006/006218 A1 | 1/2006 |
| WO | WO2006/062349 A1 | 6/2006 |
| WO | WO 2006/109909 | 10/2006 |
| WO | WO2006/132052 A2 | 12/2006 |
| WO | WO 2007/017506 | 2/2007 |
| WO | WO 2007/034873 | 3/2007 |
| WO | WO 2007/050466 | 5/2007 |
| WO | WO2007/058421 A1 | 5/2007 |
| WO | WO 2007/097534 | 8/2007 |
| WO | WO2008/016236 A1 | 2/2008 |
| WO | WO 2008/051885 | 5/2008 |
| WO | WO 2008/070914 | 6/2008 |
| WO | WO2008/101190 A1 | 8/2008 |
| WO | WO 2008/113133 | 9/2008 |
| WO | WO 2008113133 A1 * | 9/2008 ............. H01M 4/14 |
| WO | WO 2009/013796 | 1/2009 |
| WO | WO 2009/041180 | 4/2009 |
| WO | WO 2009/071292 | 6/2009 |
| WO | WO 2009/005170 | 8/2009 |
| WO | WO 2009/094931 | 8/2009 |
| WO | WO 2009/101047 | 8/2009 |
| WO | WO 2009/128482 | 10/2009 |
| WO | WO 2010/122873 A1 | 10/2010 |

OTHER PUBLICATIONS

Lam, LT et al., "Development of ultra-battery for hybrid-electric vehicle applications", Journal of Power Sources 158 (2006) 1140-1148.
U.S. Appl. No. 13/996,934, Furukawa el al., filed Jun. 21, 2013.
English translation of JP Office Action in 2009-540546 mailed Nov. 8, 2013.
Russian Patent Application No. 2012111222—Office Action (English translation included), mailed Aug. 27, 2014.
Russian Patent Application No. 2012111683—Office Action (English translation included), mailed Sep. 3, 2014.
U.S. Office Action issued in U.S. Appl. No. 13/996,934 dated Jul. 9, 2015.
Examiner's Report No. 2 on Australian Patent Appln. No. 2004273104 dated Sep. 21, 2009.
International Search Report for PCT/AU2004/001262, mailed Nov. 8, 2004.
International Search Report for PCT/AU2007/001916, mailed Feb. 21, 2008.
International Search Report for PCT/AU2008/000405, mailed May 20, 2008.
International Search Report for PCT/JP2010/055479, mailed Jun. 22, 2010.
International Search Report for PCT/AU2010/001113, mailed Oct. 27, 2010.
International Search Report for PCT/JP2010/064984, mailed Nov. 22, 2010.
International Search Report for PCT/AU2011/001647, mailed Mar. 23, 2012.
Office Action issued in U.S. Appl. No. 12/518,521 dated Oct. 25, 2012.
Office Action issued in U.S. Appl. No. 12/518,521 dated Jan. 17, 2013.
Office Action issued in U.S. Appl. No. 12/518,521 dated Nov. 6, 2013.
Derwent Abstract Accession No. 2006-643026/67 & JP 2006-252902 (*Kawasaki Heavy Ind Ltd.*), Sep. 21, 2006 (2 pages).
Derwent Abstract Accession No. 2006-003619/01 & JP 2005-327489 (*Matsuhita Denki Sangyo KK.*), Nov. 24, 2005 (2 pages).
Derwent Abstract Accession No. 2006-036969/05 & JP 2006-310628 (*Nippon Zeon KK*), Nov. 9, 2006 (2 pages).
Derwent Abstract Accession No. 2006-110075/11, Osaka Gas Co Ltd., (Jan. 19, 2006), 2 pages.
Derwent Abstract Accession No. 2004-683934/67, Mitsubishi Chem Corp., (Sep. 30, 2004), 2 pages.
Derwent Abstract Accession No. 2004-395525/37, Shin Kobe Electric Machinery., (Apr. 30, 2004), 2 pages.
Derwent Abstract Accession No. 2005-135458/15, TDK Corp., (Jan. 27, 2005), 2 pages.
Office Action issued in U.S. Appl. No. 12/518,521 dated Jun. 9, 2014.
Office Action issued in U.S. Appl. No. 12/518,521 dated Mar. 10, 2015.
Office Action issued in U.S. Appl. No. 13/265,944 dated Dec. 24, 2014.
Office Action issued in U.S. Appl. No. 13/265,944 dated Apr. 9, 2015.
Office Action issued in U.S. Appl. No. 13/392,774 dated Sep. 30, 2014.
Office Action issued in U.S. Appl. No. 13/392,774 dated May 21, 2015.
Office Action issued in U.S. Appl. No. 13/392,734 dated Jul. 7, 2014.
Office Action issued in U.S. Appl. No. 13/392,734 dated Feb. 27, 2015.
Office Action issued in U.S. Appl. No. 12/531,956 dated Feb. 21, 2012.
Office Action issued in U.S. Appl. No. 12/531,956 dated Aug. 1, 2012.
Office Action issued in U.S. Appl. No. 12/531,956 dated May 9, 2013.
Office Action issued in U.S. Appl. No. 12/531,956 dated Nov. 22, 2013.
Office Action issued in U.S. Appl. No. 12/531,956 dated Apr. 17, 2014.
U.S. Appl. No. 12/110,913, Lara-Curzio et al., filed Apr. 28, 2008.
U.S. Appl. No. 12/156,644, Shi et al., filed Jun. 4, 2008.
Office Action issued in U.S. Appl. No. 12/531,956 dated Jul. 28, 2015.
Office Action issued in U.S. Appl. No. 12/531,956 dated Nov. 6, 2014.
Office Action issued in U.S. Appl. No. 13/265,944 dated Oct. 27, 2015.
Office Action issued in U.S. Appl. No. 13/996,934 dated Dec. 24, 2015.
Office Action issued in U.S. Appl. No. 13/392,734 dated Oct. 7, 2015.
Chinese Patent Application No. 201080047297.07—First Notification of Office Action (English translation included), mailed Apr. 3, 2014.

(56) References Cited

OTHER PUBLICATIONS

European Patent Application No. 10814794.3—Search Report, mailed Dec. 2, 2013.
Japanese Patent Application No. 2012-52822—Office Action (English translation included), mailed Apr. 22, 2014.

* cited by examiner

METHOD FOR PRODUCING HYBRID NEGATIVE PLATE FOR LEAD-ACID STORAGE BATTERY AND LEAD-ACID STORAGE BATTERY

This application is the U.S. national phase of International Application No. PCT/JP2010/064985, filed 26 Aug. 2010, which designated the U.S. and claims priority to JP Application No. 2009-196200, filed 27 Aug. 2009, the entire contents of each of which are hereby incorporated by reference.

TECHNICAL FIELD

The present invention relates to the hybrid negative plate so constructed that the surface of a negative plate is coated with a porous carbon mixture prepared by mixing two types of carbon materials consisting of a first carbon material having electroconductivity and a second carbon material having capacitor capacitance and/or pseudocapacitor capacitance, and at least a binder, and to a lead-acid storage battery provided with the hybrid negative plate.

BACKGROUND ART

In National Publication No. 2007-506230 of the Japanese translated version, there is proposed such an invention that a hybrid negative plate for a lead-acid storage battery is produced by coating the surface of a negative plate, namely, a lead active material-filled plate with a porous carbon mixture layer formed by applying a carbon mixture prepared by mixing at least two types of carbon materials selected from a first carbon material having electroconductivity and a second carbon material having capacitor capacitance and/or pseudocapacitor capacitance, and at least a binder to the negative plate and then drying, is capable of drastically prolonging a cycle life of the battery owing to the function of the capacitor thereof even in repetition of quick charge-discharge under partial state of charge (PSOC).

PRIOR ART REFERENCE

Patent Reference

Patent Reference 1 National Publication No. 2007-506230 of the Japanese translated version.

SUMMARY OF THE INVENTION

Problem to be Solved by the Invention

The above-mentioned invention is, concretely, a method for producing a hybrid negative plate by applying the above-mentioned carbon mixture in the form of a paste onto the surface of a lead active material-filled plate followed by drying it to form thereon a porous carbon mixture layer.

In such a case where a negative plate is coated with a carbon mixture to produce a hybrid negative plate, the negative plate prepared by filling a current collector lattice substrate with a negative active material contains much moisture and is soft, and therefore, if its surface is coated with a pasty carbon mixture using a scraper, then there is involved such inconvenience that the active material is partially scraped or that the applied carbon mixture is partially peeled after drying because the adhesion thereof to the negative plate is poor. Accordingly, for preventing the inconveniences, after the above-mentioned wet negative plate has to be aged to become an aged plate or to be dried to become a dried negative plate like a dry charged plate, a pasty carbon mixture has to be coated on the surface thereof. In this case, as for the coating methods, a method of coating a carbon mixture in the form of either paste or slurry onto the surface of a dried negative plate using a scraper or the like, a method of coating it thereonto using with a brush, a printing method, or the like is considered. However, when any of those coating methods is used, a step of drying again after the coating is required, and therefore there is involved such a problem that the operation for producing the hybrid negative plate becomes inefficient.

Further, even in a case of continuous production of a negative plate in a continuous casting or expanding system, the continued negative electrode is once cut, aged and dried one by one, and is thereafter coated with a carbon mixture, so that the operational efficiency is lowered remarkably.

Furthermore, if the surface of the negative plate in a dried state is coated with a carbon mixture, then a coating layer of a dense carbon mixture is formed, and this layer often hinders the movement of an electrolytic solution to the negative plate which is located on the inside of the coating layer, and accordingly the discharge performance is lowered.

In view of the prior art mentioned above, the present invention is to solve the prior-art problems of the conventional invention and to provide a method for producing a hybrid negative plate capable of simplifying the production step and improving the production efficiency, and a lead-acid storage battery provided with the hybrid negative plate which is improved in the battery characteristics.

Means for Solving Problem

The invention is, as described in claim 1, a method for producing a hybrid negative plate for a lead-acid storage battery produced by applying the surface of a negative active material-filled plate with a carbon mixture which is prepared by mixing two types of carbon materials consisting of a first carbon material having electroconductivity and a second carbon material securing capacitor capacitance and/or pseudocapacitor capacitance, and at least a binder, wherein a carbon mixture sheet prepared by forming the carbon mixture into a sheet is adhered by pressure to at least a part of the surface of the negative active material in a wet state, and is then dried.

The invention as described in claim 2 or 3, is characterized in that the carbon mixture sheet is formed into a sheet by an extrusion forming method or a coating method with the carbon mixture, or is received by a porous sheet carry to be formed into a sheet thereon.

Furthermore, the invention as described in claim 4, is characterized in that the carbon mixture is formed into a sheet and is then pressed.

Furthermore, the invention as described in claim 5 or 6, is characterized in that at least one selected from the group of a zinc powder, a camphor powder, a naphthalene powder and an aluminum powder is added to the carbon mixture as a pore forming agent.

Furthermore, the invention as described in claim 7, is characterized in a lead-acid storage battery which is provided with the hybrid negative plate produced by the production method according to any one of claims 1 to 6 mentioned above.

Effect of the Invention

According to the invention of claim 1, 2 or 3, the hybrid negative plate can be produced at a good working efficiency and is improved in the productivity, and since the surface of the negative active material-filled plate is coated with a porous carbon mixture sheet in an adhered state, a good-quality hybrid negative plate which permits an electrolytic solution to move and supply to the inner side and prevents the lead active material from degrading can be produced, and also brings about improvement in the quick discharge characteristics and the discharge characteristics at a low temperature under the PSOC of the lead-acid storage battery.

Further, according to the invention of claim 4, since the carbon mixture is formed into a sheet, dried and is then pressed, the electroconduction path in the carbon mixture can be secured easily, and accordingly the amount of the first carbon material having electroconductivity in the carbon mixture can be reduced. Consequently, it becomes possible to make the carbon mixture layer thinner, and it becomes possible to reduce the internal resistance of the lead-acid storage battery according as the thickness of the carbon mixture layer is made thinner.

Furthermore, according to the invention of claim 5 or 6, by adding a pore forming agent selected from the group of a zinc powder a camphor powder, a naphthalene powder and an aluminum powder, to the carbon mixture, the porosity of the carbon mixture layer is increased, supply of sulfuric acid to the surface of the electrode plate is facilitated and the high rate discharge characteristics is enhanced.

Furthermore, according to the invention of claim 7, by constructing a lead-acid storage battery provided with the above-mentioned hybrid negative plate, a lead-acid storage battery which is improved in quick-discharge characteristics and discharge characteristics at a low temperature, etc, can be obtained.

MODE FOR CARRYING OUT THE INVENTION

Embodiments of the mode for carrying out the invention are described in detail hereinunder.

The basic constitution of the negative plate for a lead-acid storage battery is a negative active material-filled plate constructed by filling a conventionally-known lead active material in a current collector lattice substrate. According to the invention, a carbon mixture prepared by mixing two types of carbon materials consisting of a first carbon material comprising at least one selected from carbon black such as acetylene black or furnace black, ketjen black, graphite or the like, which is necessary for securing the electroconductivity of the surface of the negative active material-filled plate, and a second carbon material comprising at least one selected from activated carbon, carbon black, graphite or the like which is necessary for securing the capacitor and/or pseudocapacitor capacitance, that is, the capacitor function, and at least a binder is formed into a sheet as described in detail hereinafter, and the resultant sheet is adhered under pressure to at least a part of the surface of the negative active material-filled plate, so that a hybrid negative plate for a lead-acid storage battery according to the invention is produced. Specifically, the sheeted coating area may be the entire surface of on both sides or on either one side of the negative active material-filled plate, or a part of the surface on both sides or on either one side thereof.

Further, the first carbon material is necessary for securing electroconductivity, and carbon black such as acetylene black and furnace black, ketjen black and the like are preferably used. In addition to these, carbon black such as thermal black, channel black and lamp black, as well as carbon fiber, graphite and the like may be also used. In these carbon materials, it is preferable in general that the amount of the surface functional group is smaller from the viewpoint of taking the electroconductivity into account.

If the mixed amount of the first carbon material is less than 5 parts by weight, then the electroconductivity can not be secured and the capacitor capacitance is lowered, and on the other hand, if the mixed amount is more than 70 parts by weight, then the electroconductivity effect is saturated. The more preferable mixed amount is from 10 to 60 parts by weight.

Furthermore, the second carbon material is necessary for securing the capacitor and/or pseudocapacitor capacitance, and activated carbon, carbon black such as acetylene black and furnace black, ketjen black and the like are preferably used. In addition to these, thermal black, channel black, graphite and the like are suitable. From the viewpoint of the capacitance of the capacitor, activated carbon is especially preferable.

From the viewpoint that the second carbon material secures capacitor and/or pseudocapacitor capacitance, if the mixed amount thereof is less than 20 parts by weight, then the capacitor capacitance is insufficient, but if it is more than 80 parts by weight, then the proportion of the first carbon material is relatively decreased and therefore the capacitance is rather lowered. The more preferable mixed amount is from 30 to 70 parts by weight.

The binder is useful for improving the binding of the first and second carbon materials together and the binding of the surface of the negative plate and the carbon mixture coating layer together, and securing the electrical interconnection therebetween, and also sustaining the porous state of the carbon mixture after drying the carbon mixture paste. As for the materials of the binder, polychloroprene, styrene-butadiene rubber (SBR), polytetrafluoroethylene (PTFE), polyvinylidene fluoride (PVDF) and the like are preferable.

If the mixed amount of the binder is less than 1 part by weight, then the binding is insufficient, but if more than 20 parts by weight, then the binding effect is saturated and, on the other hand, the binder acts as an insulator to the electroconductivity. The mixed amount thereof is more preferably from 5 to 15 parts by weight.

Furthermore, a thickener and a short-fiber reinforcing material may be mixed.

The thickener is useful for preparing a carbon mixture in the form of paste. For the aqueous paste, cellulose derivatives such as carboxymethyl cellulose (CMC) and methyl cellulose (MC), polyacrylic acid salts, polyvinyl alcohol and the like are suitable, and for the organic paste, NMP (N-methyl-2-pyrrolidone, 1-methyl-2-pyrrolidone), dimethyl sulfoxide (DMSO) and the like are suitable. In a case where the thickener is used, if the dried residue thereof exceeds 10 parts by weight, the electroconductivity of the carbon mixture is deteriorated. Therefore, the mixed amount not less is preferably less than that, and that a preferably mixed amount thereof is 1 to 6 parts by weight.

As for the short-fiber reinforcing material, in a case where the carbon mixture is prepared to become a paste state and is applied to the negative plate, it is useful for improving the permeability of gas and preventing the carbon mixture layer from peeling. Any material thereof is sufficient if it is a hydrophobic material which is stable in acid of sulfuric acid, such as carbon, glass, polyester resin such as polyethylene terephthalate (PET) or the like. It is preferable that it is from 1 to 30 µm in thickness and is from 0.05 to 4.0 mm in length. Furthermore, in a case where a fibrous material having an aspect ratio of more than 1000 is added, clumping thereof may occur at the time of kneading, transporting and coating of the mixture, so that the productivity is lowered. Therefore, it is preferable that the aspect ratio does not exceed 1000, and the aspect ratio is more preferably from 25 to 500. If the mixed amount thereof is more than 16 parts by weight, then the relative proportion of the carbon materials and the binder is lowered, so that the performance is worsen and at the same time the electroconductivity of the carbon mixture is lowered, and therefore, the mixed amount is preferably less than that. A more preferable mixed amount is from 4 to 12 parts by weight.

As for the carbon mixture sheet, there are various forming methods as mentioned below.

The first carbon material having the function of securing electroconductivity and the second carbon material having the function of securing capacitance and/or pseudocapacitor capacitance is mixed with a dispersant for the binder and an aqueous solution for the thickener to prepare a carbon mixture in a form of either paste or slurry, and the carbon mixture paste or slurry is then formed into a sheet according to an extrusion method or a coating method, so that a carbon mixture sheet is produced.

Furthermore, the carbon mixture sheet may be produced using a coater which is generally used in producing electrodes for lithium ion batteries or electric double layer capacitors. Furthermore, in a case where a carbon mixture sheet having a size of one electrode plate is produced, a small-size machine such as a table coater or the like may be used.

Furthermore, the carbon mixture sheet is produced by receiving the carbon mixture by a porous sheet such as nonwoven fabric and forming it into a sheet thereon. One concrete example of the production method thereof is such that the first electroconductive carbon material and the second carbon material functioning as a capacitor are mixed with the dispersant for the binder or the aqueous solution for the thickener to make a carbon mixture in a form of slurry, and the carbon mixture slurry is impregnated into a porous sheet such as nonwoven fabric, and is then dried, so that a carbon mixture sheet is produced. In this production method, in the step of drying the slurry carbon mixture, the solid matter contained in the slurry carbon mixture is deposited on and adhered to the surface of the skeleton constituting the porous sheet, so that the original pore section in the porous sheet is narrowed slightly, but an infinite number of coarse pores are sustained in the sheet and at the same time the evaporated moisture forms an infinite number of pores in the carbon mixture on the skeleton surface constituting the porous sheet, and after all, a porous carbon mixture sheet can be obtained.

Furthermore, another production method is such that after the carbon mixture is formed into a sheet in the same manner as in the above-mentioned method, the carbon mixture sheet is dried and pressed, so that a carbon mixture sheet is obtained. By this method, assuring of securing of the electroconduction path in the carbon mixture becomes easier, and consequently the electroconductive carbon amount contained in the carbon mixture can be reduced.

In the case of pressing of the carbon mixture sheet, when the carbon mixture sheet is so pressed by a roller that the thickness of the pressed carbon mixture sheet may become from 30 to 70% of the thickness of the original carbon mixture layer, in other words, the compressibility is from 30 to 70%, securing of the electroconduction path in the carbon mixture become easier. However, if the compressibility is 30% or less, then the securing effect is hardly obtained and if the compressibility exceeds 70%, then the securing effect is saturated.

Furthermore, it is also effective to add at least one pore forming agent selected from the group selected from a zinc power, a camphor powder and a naphthalene powder and an aluminum powder to the carbon mixture. At the time of formation, the added aluminum powder or zinc powder reacts with an electrolytic solution of sulfuric acid and dissolves therein, so that since fine pores are formed behind in the carbon mixture, and the added camphor powder or naphthalene powder is sublimed at the time of preheating, aging or drying, so that fine pores are formed at traces thereof in the carbon mixture, and consequently the porosity of the carbon mixture coating layer is increased. Thus, sulfuric acid supply to the surface of the negative plate is facilitated by adding such a pore forming agent, and the high rate discharge characteristic is improved. In addition, since gas generated during charging is gone off easily, peeling of the carbon mixture layer owing to gas generation can be prevented.

The addition amount of the pore forming agent in a single or plural use in general is from 3 to 20 parts by weight relative to the carbon mixture in terms of conversion thereof into aluminum. The addition amount of the zinc powder is from 8 to 50 parts by weight, that of the camphor powder is from 1 to 8.5 parts by weight, and that of the naphthalene powder is from 1.5 to 25 parts by weight. If the addition amount is less than 3 part by weight, then the above-mentioned addition effect can not be exhibited and if the addition amount is more than 20 parts by weight, then the addition effect is saturated. From the economical point of view, the addition amount is preferably limited to 20 parts by weight.

When the carbon mixture sheet is adhered to the negative active material-filled plate, supply of the electrolytic solution to the negative active material located below the sheet is not retarded and the discharge performance is not hindered due to the numerous coarse pores formed in the sheet. In addition, at the same time, the skeleton of the porous sheet can prevent the carbon mixture from cracking and dropping off in the same action as that of the above-mentioned short fibers, and also the carbon mixture layer of the carbon mixture in the sheet form prepared by impregnating the carbon mixture into the porous sheet can be adhered to the surface of the active material-filled plate of a negative plate in a wet state, so that there is brought about such an effect that at a single drying step, the hybrid negative plate according to the present invention coated with the porous carbon mixture can be produced at a high efficiency in the production thereof.

As for the porous sheet, woven fabrics or nonwoven fabrics made of synthetic fibers, glass fibers, pulp or the like which are used for battery separators or paste sheets may be used. Nonwoven fabric and paper made by papermaking are large in open diameter and good in penetration of a slurry carbon mixture thereinto, and also are soft, and therefore are suitable especially to the object of the present invention. When carbon fibers are used, the electroconductivity is given to the porous sheet, and accordingly is more effective.

The carbon mixture sheet thus produced is laminated to the surface of a negative electrode active material-filled plate in a wet state, and thereafter is pressed by a roller press, etc., and thereafter is aged and dried, so that a hybrid negative plate coated with the carbon mixture sheet according to the present invention can be obtained.

In this case, the carbon mixture sheet is laminated to the surface of the negative electrode active material-filled plate in a wet state, and is then roll-pressed, so that the negative electrode active material existing on the inside thereof is partially bitten into the carbon mixture sheet, so that even after aged and dried, the adhesion is not lowered and peeling the carbon mixture sheet from the negative plate is not occurred.

According to the production method for the hybrid negative plate of the invention mentioned above, a long carbon mixture sheet is continuously laminated in the same manner as a continuous laminating method of a long paste sheet as seen in a continuous negative plate production method. When a hybrid negative plate is produced continuously, a long carbon mixture sheet is used, and the hybrid negative plate can be continuously produced without lowering the operational efficiency.

Furthermore, according to the hybrid negative plate production method of the invention, after a negative active material is filled in the lattice substrate, a carbon mixture layer is continuously laminated to the negative active material filled plate, and in addition, a drying step is enough with one step, and the coating layer can be easily adjusted to have a uniform thickness without occurrence in coating unevenness. Thus, as compared with the conventional case of producing the hybrid negative plate by coating the carbon mixture, the operational efficiency for the production according to the invention is remarkably improved. Moreover, in the case where the carbon mixture sheet is produced by using the above-mentioned porous sheet, since the carbon mixture sheet is porous, part of the lead active material is penetrate into the carbon mixture sheet, so that, the binding capacity and the adhesion is further enhanced.

Furthermore, the porosity of the carbon mixture sheet is suitably and preferably from 40 to 90%. If the porosity is less than 40%, then electrolytic solution movement is retarded and the quick charge-discharge performance is lowered. If more than 90%, the coating effect is saturated and the thickness becomes so large that causes a difficulty in making a design.

Examples of the invention are shown below.

Example 1

Furnace black as the first carbon material having electroconductivity, activated carbon as the second carbon material having a capacitor function, polychloroprene as the binder, carboxymethyl cellulose (CMC) as the thickener, and water as the dispersant were used and these were mixed in the mixed ratio as shown in Table 1 below using a mixer, so that a pasty carbon mixture was prepared, and this was extruded out from a slit nozzle by a pump, and was continuously applied onto a paste sheet having a width of 76 mm, so that a carbon mixture sheet having a thickness of 0.3 mm was produced.

On the other hand, a negative plate which is to be used for the negative electrode of a valve regulated lead-acid storage battery provided with an electrolytic solution in such a degree that the electrolytic solution is impregnated in and held by an element, was produced according to a known method. Namely, a lead active material-filled plate was produced by filling a lead active material in a wet state in a current collector lattice substrate made of a lead alloy. The dimension of the lead active material-filled plate was a width of 76 mm, a length of 76 mm and a thickness of 1.4 mm. The 76 mm wide carbon mixture sheet produced as mentioned above was laminated, as it remains in the wet state without being dried, to both surfaces of the active material-filled plate, and thereafter this was roll-pressed, and was then aged and dried according to a known method, so that a hybrid negative plate according to the invention was produced. The roll-pressing step is for securing of adhering the carbon mixture sheet and the negative active material together, and the pressure in the roll-pressing is preferably higher, but is adjusted to such a degree that the filled active material paste may not be protruded outside and the current collector lattice substrate may not be deformed.

The forgoing five hybrid negative plates each coated with the carbon mixture sheets, and four positive plates each having a wide of 76 mm, a length of 76 mm and a thickness of 1.7 mm in size produced according to a known method were alternately stacked through each of AGM separators to assemble an element and the element was put in a battery case (single cell) according to the same method as a known construction method of constructing a valve regulated lead-acid storage battery in which the element holds an electrolytic solution impregnated therein, so that a valve regulated lead-acid storage battery of 2 V having a 5 hour rate capacity of 10 Ah, under a positive electrode capacity control was constructed. At the time of the construction, a spacer was inserted between both ends of the element and the battery case so that the degree of compression of the element was adjusted to be 50 kPa.

Next, an aqueous solution of sulfuric acid was so prepared as an electrolytic solution by dissolving 30 g/liter of aluminum sulfate octadeca hydrate in water as to have a specific gravity of 1.24, and 119 g/cell of the electrolytic solution was poured into the battery case, and formation was carried out in the battery case. After formation in the battery case, the 5 hour rate capacity of the valve regulated lead-acid storage battery was measured, and it was about 10 Ah.

TABLE 1

| Mixed Composition of Pasty Carbon Mixture | |
|---|---|
| First carbon material, furnace black | 115 parts by weight |
| Second carbon material, active carbon | 100 parts by weight |
| Binder, polychloroprene | 20 parts by weight |
| Thickener, CMC | 10 parts by weight |
| Dispersion medium, water | 800 parts by weight |

Example 2

Furnace black as the first carbon material having electroconductivity, activated carbon as the second carbon material having a capacitor function, polychloroprene as the binder, CMC as the thickener, Tetron, i.e., polyethylene terephthalate fiber, as the short-fiber reinforcing material and water as the dispersion medium were used and these were mixed in the mixed ratio as shown in Table 2 below, using a mixer, so that a carbon mixture in a paste state was prepared, and the pasty carbon mixture was coated onto a polypropylene (PP) sheet having a size of 76 mm×76 mm using a table coater, and was dried, and was then peeled off from the PP sheet, so that a carbon mixture shaped into a sheet and having a thickness of 0.3 mm was produced.

On the other hand, a negative plate which is to be use for the negative electrode of a valve regulated lead-acid storage battery, that is, the above-mentioned lead active material-filled plate prepared by filling a lead active material in a wet state in a current collector lattice substrate was produced according to a known method. The dimension of the lead active material-filled plate was a wide of 76 mm, a length of 76 mm and a thickness of 1.4 mm. The carbon mixture sheet having a size of a wide of 76 mm and length of 76 mm produced in the above was laminated to both surfaces of the active material-filled plate to be adhered thereto, and thereafter this was roll-pressed, and was then aged and dried according to a known method, so that a hybrid negative plate according to the invention was produced. The roll-pressing step is for securing of adhering the carbon mixture sheet and the negative active material together, and the pressure in the roll-pressing is preferably higher, but is adjusted to such a degree that the filled active material paste may not be protruded outside and the current collector electric lattice substrate may not be deformed.

The forgoing five hybrid negative plates each coated with the carbon mixture sheets, and four positive electrode plates each having a wide of 76 mm, a length of 76 mm and a thickness of 1.7 mm in size produced according to a known method were alternately stacked through each of AGM separators to assemble an element, and the element was put in a battery case (single cell) according to the same method as a known construction method of constructing a valve regulated lead-acid storage battery in which the element holds an electrolytic solution impregnated therein, so that a valve regulated lead-acid storage battery of 2 V having a 5 hour rate capacity of 10 Ah under a positive electrode capacity control was constructed. At the time of the construction, a spacer was inserted between both ends of the element and the battery case so that the degree of compression of the element was adjusted to be 50 kPa.

Next, an aqueous solution of sulfuric acid was so prepared as an electrolytic solution by dissolving 30 g/liter of aluminum sulfate octadeca hydrate in water as to have a specific gravity of 1.24, and 119 g/cell of the electrolytic solution was poured into the battery case and formation was then carried out in the battery case. After formation in the battery case, the 5 hour rate capacity of the valve regulated lead-acid storage battery was measured, and it was about 10 Ah.

TABLE 2

Mixed Composition of Pasty Carbon Mixture

| First carbon material, furnace black | 115 parts by weight |
| Second carbon material, active carbon | 100 parts by weight |
| Binder, polychloroprene | 25 parts by weight |
| Thickener, CMC | 10 parts by weight |
| Short-fiber reinforcing material, Tetron | 13 parts by weight |
| Dispersion medium, water | 700 parts by weight |

Comparison Example 1

The negative active material-filled plate produced in Example 1, in which the active material was in a wet state, was aged and dried according to a known method, so that a negative plate was produced, and a pasty carbon mixture prepared by mixing the same mixed composition as in Table 2 using a mixer was applied to both surfaces of the negative plate using a scraper so that a coating layer thereof having a thickness of 0.30 mm may be formed, and this was dried, so that a hybrid negative plate provided with the carbon mixture coating layer on both surfaces of the active material-filled plate was produced. Using this, a 2 V lead-acid storage battery was constructed in the same manner as in Example 1, and after formation was carried out in the battery case, the 5 hour rate capacity of the lead-acid storage battery was measured and it was about 10 Ah.

Next, for the valve regulated lead-acid storage batteries produced in Examples 1 and 2 and Comparison Example 1, a life test in which the quick charge-discharge under PSOC was repeated based on the simulation of driving of a hybrid electric vehicle (HEV). The test was such that after the valve regulated lead-acid storage battery was discharged at 2 A for 1 hour to become PSOC 80%, in an atmosphere at 40° C., discharging at 50 A, for 1 second and charging at 20 A, for 1 second were repeated 500 times, and thereafter charging at 30 A, for 1 second and 1 second pausing were repeated 510 times. This was counted as one cycle. After this test was repeated 400 cycles, the internal resistance of each of the lead-acid storage batteries was measured. The results are shown in Table 3 below. In addition, a conventional valve regulated lead-acid storage battery provided with the conventional negative plate not coated with the carbon mixture was used up in its life at 180 cycles, and therefore this is not shown in Table 3.

TABLE 3

Internal Resistance after 400 Cycles in Life Test

| | Internal Resistance (mΩ) |
|---|---|
| Example 1 | 2.1 |
| Example 2 | 2.0 |
| Comparison Example 1 | 2.4 |

As clear from the above Table 3, it has been confirmed that for the lead-acid storage batteries provided with the hybrid negative plates produced according to the production method of the invention described in Examples 1 and 2, the internal resistance after 400 cycles is lowered remarkably as compared with the valve regulated lead-acid storage battery provided with the hybrid negative plate produced according to the production method in Comparison Example 1, and the production method of the invention brings about excellent lead-acid storage batteries. This demonstrates that, according to the production method of the invention, a hybrid negative plate which is improved in adhesion between the surface of the negative active material and the carbon mixture can be obtained.

For the conventional hybrid negative plate produced by directly applying under pressure a pasty carbon mixture to a negative active material-filled plate in a wet state to form a carbon mixture layer, the negative active material surface and the carbon mixture layer are adhered together in appearance, but, actually, the surface of the lead active material is rough and therefore, the two members are in point contact with each other. Accordingly, when the life test in which the quick charge-discharge is repeated under PSOC is carried out, it is considered that the charge acceptability of the lead active material not in contact with the carbon mixture layer is lowered, and as every cycle is elapsed, the active material is deteriorated and, as a result, the internal resistance is increased.

In contrast thereto, for the hybrid negative plate produced according to the production method of the invention, the pasty carbon mixture formed into a sheet is roll-pressed by pressure to the negative active material-filled plate in a wet state, and accordingly the two members are entirely adhered to each other. As a result, it is considered that the internal resistance of the valve regulated lead-acid storage battery provided with the hybrid negative plate after 400 cycles in the life test, is lowered as compared with the internal resistance of the lead-acid storage battery provided with the hybrid negative plate in Comparison Example 1, because the lead active material is hardly deteriorated owing to the fact that the adhered state of the carbon mixture sheet to the entire surface of the negative active material-filled plate is sustained.

Further, in the above Examples 1 and 2, polychloroprene was used as the binder, but in place of it, any other kind of binder, for instance, SRB may be used.

Next, the effect caused by pressing after a carbon mixture is shaped into a sheet and the effect caused by adding a pore forming agent to a carbon mixture were confirmed as follows.

Example 3

Furnace black as the first carbon material having electroconductivity, activated carbon as the second carbon material having a capacitor function, polychloroprene as the binder, CMC as the thickener, and water as the dispersion medium, were used and these were mixed in the mixed ratio as shown in Table 4 below, using a mixer, so that a pasty carbon mixture was prepared, and this was then extruded out from a slit nozzle by a pump, and was continuously applied onto a paste paper sheet having a width of 76 mm so that a thickness of a carbon mixture may become 0.3 mm. This was continuously dried in a far-IR drying furnace at an ambient temperature of 200° C. for 2 minutes, and was then roll-pressed to compress so that a thickness of the carbon mixture may reduce to 50% of the original thickness, and as a result a carbon mixture sheet having a thickness of 0.15 mm was produced.

On the other hand, a negative plate to be used as the negative electrode of a valve regulated lead-acid storage battery, that is, the above-mentioned lead active material-filled plate comprising a current collector lattice substrate and a lead active material filled therein was produced according to a known method. The dimension of the wet lead active material-filled plate was a width of 76 mm, a length of 76 mm and a thickness of 1.4 mm. The carbon mixture sheet having a width of 76 mm produced in the above was laminated to the surface of the negative electrode active material-filled plate, and thereafter this was roll-pressed, then aged and dried according to a known method, so that a hybrid negative plate of the invention was produced. The roll-pressing step is for adhering the carbon mixture sheet and the negative active material together, and the pressure of the roll-pressing is preferably higher, but is controlled to such a degree that the filled active material paste may not be protruded outside and the current collector lattice substrate may not be deformed.

Five hybrid negative plates each provided with the carbon mixture sheet, and four positive plates having a width of 76 mm, a length of 76 mm and a thickness of 1.7 mm in size produced according to a known method were alternately stacked through each of AGM separators to assemble an element, and the element was put in a battery case (single cell) according to the same method as a known construction method of constructing a valve regulated lead-acid storage battery in which the element holds an electrolytic solution impregnated therein, so that a valve regulated lead-acid storage battery of 2 V having a 5 hour rate capacity of 10 Ah under a positive plate control was constructed. At the time of the construction, a spacer was inserted between both the ends of the element and the battery container, so that the degree of compression of the element was adjusted to be 50 kPa.

Next, an aqueous solution of sulfuric acid was prepared as an electrolytic solution, by dissolving 30 g/liter of aluminum sulfate octadeca hydrate in water to have a specific gravity of 1.24. 119 g/cell of the electrolytic solution was poured into the battery case and formation was carried out. After formation in the battery case, the 5 hour rate capacity of the valve regulated lead-acid storage battery was measured, and it was about 10 Ah.

The porosity of the carbon mixture sheet was 50% at the stage where the sheet was continuously dried at 200° C. for 2 minutes, in a far-IR drying furnace and was then pressed by a roll to reduce to half the thickness the dried carbon mixture sheet, and after the battery case formation was finished, the porosity of the sheet was 35%.

TABLE 4

Mixed Composition of Pasty Carbon Mixture

| | |
|---|---|
| First carbon material, furnace black | 12 parts by weight |
| Second carbon material, active carbon | 100 parts by weight |
| Binder, polychloroprene | 10 parts by weight |
| Thickener, CMC | 3 parts by weight |
| Dispersion medium, water | 300 parts by weight |

Example 4

A hybrid negative plate of the invention was produced in the same manner as in Example 3 except that a zinc powder of 7.9 parts by weight (1 part by weight in terms of Al) was added to the pasty carbon mixture as shown in Table 4. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 37%.

Example 5

A hybrid negative plate of the invention was produced in the same manner as in Example 3 except that a zinc powder of 23.7 parts by weight (3 parts by weight in terms of Al) was added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case was 58%.

Example 6

A hybrid negative plate of the invention was produced in the same manner as in Example 3 except that a zinc powder of 79 parts by weight (10 parts by weight in terms of Al) was added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 58%.

Example 7

A hybrid negative plate of the invention was produced in the same manner as in Example 3 except that a zinc powder of 157.8 parts by weight (20 parts by weight in terms of Al) was added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 75%.

Example 8

A hybrid negative plate of the invention was produced in the same manner as in Example 3 except that a zinc powder of 165.7 parts by weight (21 parts by weight in terms of Al) was added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 75%.

Example 9

A hybrid negative plate of the invention was produced in the same manner as in Example 3 except that an aluminum powder of 10 parts by weight was added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 58%.

Example 10

A hybrid negative plate of the invention was produced in the same manner as in Example 3 except that a camphor powder of 11.1 parts by weight (10 parts by weight in terms of Al) was added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 58%.

Example 11

A hybrid negative plate of the invention was produced in the same manner as in Example 3 except that a naphthalene powder of 13.2 parts by weight (10 parts by weight in terms of Al) was added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 58%.

Example 12

A hybrid negative plate of the invention was produced in the same manner as in Example 3 except that a zinc powder of 79 parts by weight (10 parts by weight in terms of Al) and an aluminum powder of 10 parts by weight were added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 73%.

Example 13

A hybrid negative plate of the invention was produced in the same manner as in Example 3 except that a camphor powder of 11.1 parts by weight (10 parts by weight in terms of Al) and an aluminum powder of 10 parts by weight were added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 73%.

Example 14

A hybrid negative plate of the invention was produced in the same manner as in Example 3 except that a naphthalene powder of 13.2 parts by weight (10 parts by weight in terms of Al) and an aluminum powder of 10 parts by weight were added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 73%.

Example 15

A hybrid negative plate of the invention was produced in the same manner as in Example 3 except that a zinc powder of 26.3 parts by weight (3.33 parts by weight in terms of Al) and a camphor powder of 3.7 parts by weight (3.33 parts by weight in terms of Al) were added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the control valve regulated lead-acid storage battery was measured, and it was about 10 Ah.

The porosity of the carbon mixture sheet of the hybrid negative plate after the battery case formation was 58%.

Example 16

A hybrid negative plate of the invention was produced in the same manner as in Example 3 except that a zinc powder of 26.3 parts by weight (3.33 parts by weight in terms of Al), a naphthalene powder of 4.4 parts by weight (3.33 parts by weight in terms of Al) and an aluminum powder of 3.33 parts by weight were added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 58%.

Example 17

A hybrid negative plate of the invention was produced in the same manner as in Example 3 except that a zinc powder of 26.3 parts by weight (3.33 parts by weight in terms of Al), a camphor powder was 3.7 parts by weight (3.33 parts by weight in terms of Al) and a naphthalene powder of 4.4 parts by weight (3.3 parts by weight in terms of Al) were added to the above-mentioned pasty carbon mixture. Next, using the hybrid negative plate, a valve regulated lead-acid storage battery of 2 V having a 5 hour rate capacity of 10 Ah under a positive electrode capacity control was constructed in the same manner as in Example 3. After formation was carried out in the battery case, the 5 hour rate capacity of the valve regulated lead-acid storage battery was measured, and it was about 10 Ah.

The porosity of the carbon mixture sheet of the hybrid negative plate after the battery case formation was 58%.

Next, in use of the valve regulated lead-acid storage batteries produced in the Examples 1 to 17 and Comparison Example 1, a life test, in which the quick charge-discharge under PSOC was repeated based on the simulation of driving a HEV out. The test was such that after the valve regulated lead-acid storage battery was discharged at 2 A for 1 hour to become PSOC 80%, discharging at 50 A, for 1 second and charging at 20 A, for 1 second were repeated 500 times, and thereafter charging at 30 A, for 1 second and pause for 1 second were repeated 510 times in an atmosphere at 40° C. This was counted as one cycle. After this test was repeated 500 cycles, the internal resistance of the lead-acid storage battery was measured. The results are shown in Table 5 below.

TABLE 5

Internal Resistance after 500 Cycles in Life Test

| | Internal Resistance (mΩ) |
|---|---|
| Example 1 | 2.25 |
| Example 2 | 2.25 |
| Example 3 | 2.20 |
| Example 4 | 2.15 |
| Example 5 | 2.05 |
| Example 6 | 1.99 |
| Example 7 | 1.84 |
| Example 8 | 1.76 |
| Example 9 | 1.94 |
| Example 10 | 1.95 |
| Example 11 | 1.95 |
| Example 12 | 1.85 |
| Example 13 | 1.84 |
| Example 14 | 1.84 |
| Example 15 | 1.92 |
| Example 16 | 1.92 |
| Example 17 | 1.93 |
| Comparison Example 1 | 2.49 |

As clear from the above Table 5, it has been confirmed that the lead-acid storage batteries provided with the hybrid negative plate produced according to the production method of the invention as described in Examples 1 to 17 are remarkably lowered in the internal resistance after completion of 500 cycles, as compared with the lead-acid storage battery provided with the hybrid negative plate produced according to the production method as described in Comparative Example 1, and provides excellent lead-acid storage batteries. It has been proven that in Examples 3 to 17, since the carbon mixture sheet is dried and then roll-pressed to make the carbon mixture sheet thinner, the internal resistances the lead-acid storage batteries are made lower, and furthermore, as compared with Example 3 in which a pore forming agent is not added to the carbon mixture, the lead-acid storage batteries in Examples 4 to 17 in which a pore forming is added to the carbon mixture, are made smaller in the internal resistance. This result is considered to be caused by that the electroconduction path in the carbon mixture is secured by the roll-pressed carbon mixture sheet and sulfuric acid supply to the surface of the electrode plate is facilitated, and the adhesion of the carbon mixture layer is improved by a pore forming agent.

Example 18

Next, the present invention was evaluated using a starter lead-acid storage battery provided with a large amount of free electrolytic solution. The starter lead-acid storage battery (JIS D 5301 Model B24, standard size having a width of 126 mm, a length of 236 mm and a height of 200 mm) was produced as follows. Negative electrode plates each having a dimension of a width of 102 mm, a height of 108.5 mm and a thickness of 1.5 mm were prepared for constructing 7 plates/cell. According to a known production method, a negative active material paste was filled in an electric collector lattice substrate made of a lead alloy to produce negative plate, that is, a wet lead active material-filled plate. Next, a nonwoven fabric of glass fibers having "METSUKE" weight of 100 g/m² and a thickness of 0.2 mm was dipped in the carbon mixture comprising the mixed composition as shown in Table 1 and was then pulled up to prepare a carbon mixture sheet having a thickness of 0.30 mm. The carbon mixture sheet was laminated by pressure to both surfaces of the above-mentioned negative plate in a wet state by a pair of press rollers, and was then dried at 60° C. for 1 hour, so that a hybrid negative plate was produced. At this stage, the porosity of the carbon mixture sheet of the hybrid negative plate was 50%.

On the other hand, positive plates each having a dimension of a width of 102 mm, a height of 107.5 mm and a thickness of 1.7 mm were prepared for constructing 6 plates/cell. According to a known production method, a positive active material paste was filled in an electric current collector lattice substrate made of a lead alloy, and was then aged and dried, so that the positive plate was produced. As the separator, a ribbed polyethylene sheet was worked into a bag in such a manner that the ribs may face inside the bag and be brought in contact with the positive electrode plate put in the bag. The electrolytic solution was prepared so as to have a specific gravity of 1.285 after formation was carried out in a battery case and the electrolytic solution was put into each cell in an amount of 640 g/cell. Each element comprising the above-mentioned positive plates, the hybrid negative plates and separators was produced according to a COS method, and was put in each cell chamber of the battery case having 6 cell chambers, and was fixed in such a condition that a degree of compression of the element may become 10 kPa. After the battery case provided with the elements was sealed with a cover, a negative terminal and a positive terminal were separately welded to the cells at both ends, and an electrolytic solution was then poured into the battery and a battery case formation having a charged electric amount of 180% of the rating capacity of the battery was carried out, so that a starter lead-acid storage battery provided with a large quantity of free electrolytic solution was produced. The 5 hour rate capacity of this battery was 42 Ah.

Next, for the starter lead-acid battery produced in the above Example 18, a quick discharge test at a low temperature of −15° C. according to JIS D 5031 was conducted, and the 5 second voltage at discharge, the 30 second voltage at discharge and the discharge duration time were measured. Namely, the starter lead-acid storage battery was put in a thermostat bath of −15° C. and was left for 15 hours. Thereafter, it was discharged at a current of 210 A until the cell voltage was lowered to 1.2 V, and the 5 second voltage at discharge, the 30 second voltage at discharge and the discharge duration time were measured. The results are shown in Table 6 below.

Comparison Example 2

The negative active material-filled plate produced in Example 18 was aged and dried according to a known method to produce a negative plate. The slurry carbon mixture as shown in Table 1 was directly applied to both surfaces of the negative plate without using the nonwoven fabric to form a coating layer thereon having a thickness of 0.3 mm by a pair of press rollers, so that a hybrid negative plate was produced. At this stage, the porosity of the carbon mixture sheet was 50%. Using the negative electrode plate, a starter lead-acid storage battery was produced in the same manner as in Example 18. In this case, as the separator, a composite separator which comprises a mixture of nonwoven fabric of glass fibers and synthetic fibers laminated to the surface of a polyethylene sheet and which has a thickness of 1.0 mm was worked into a bag in such a manner that the nonwoven fabric may be intended to be brought in contact with the negative plate. For the battery, the same quick discharge test at a low temperature of −15° C. as done for the starter lead-acid storage battery in Example 18 was carried out. The results are shown in Table 6.

TABLE 6

| | Results of Quick Discharge Test at Low Temperature | | |
|---|---|---|---|
| | 5 Second Voltage (V) | 30 Second Voltage (V) | Duration Time (sec) |
| Example 18 | 1.46 | 1.42 | 73 |
| Comparison Example 2 | 1.39 | 1.31 | 47 |

As clear from Table 6, the starter lead-acid storage battery provided with the hybrid negative plate produced in Example 18 of the invention exhibits extremely excellent low temperature discharge characteristics, as compared with the starter lead-acid storage battery provided with the hybrid negative plate produced in Comparison Example 2. This means that the hybrid negative plate of this invention brings about the effect given to the starter lead-acid storage battery besides the effect given to the value regulated lead-acid storage battery in Example 2. Namely, in a starter lead-acid storage battery, because there is such a problem that the conventional carbon mixture layer coated on the negative plate of the hybrid negative plate is peeled due to gas generated during the battery case formation, the hybrid negative plate has to be compressed by the composite separator composed of the mixture of the nonwoven fabric and the surface of the polyethylene separator laminated thereto in order to prevent the peeling. In contrast thereto, according to the present invention, the carbon mixture sheet itself adhered to the entire surface of the negative plate acts as prevention from peeling, and accordingly, a separator is sufficient with a polyethylene separator alone. In addition, it has been confirmed that the superfluous liquid resistance caused by the conventional composite separator described above can be eliminated and accordingly more excellent low temperature discharge characteristics can be obtained according to the present invention.

Furthermore, for a starter lead-acid battery containing a large quantity of a free electrolytic solution and provided with a hybrid negative plate which is added with the pore forming agent in the carbon mixture thereof it was evaluated as follows.

Example 19

A hybrid negative plate of the invention was produced in the same manner as in Example 18 except that a zinc powder of 7.9 parts by weight (1 part by weight in terms of Al) was added to the pasty carbon mixture as shown in Table 1. The porosity of the carbon mixture sheet of the hybrid negative plate was 55%. Next, using the hybrid negative plate, a starter lead-acid storage battery having a 5 hour rate capacity of 42 Ah was constructed in the same manner as in Example 18.

Example 20

A hybrid negative plate of the invention was produced in the same manner as in Example 18 except that a zinc powder of 23.7 parts by weight (3 parts by weight in terms of Al) was added to the pasty carbon mixture as shown in Table 1. The porosity of the carbon mixture sheet of the hybrid negative plate was 62%. Next, using the hybrid negative plate, a starter lead-acid storage battery having a 5 hour rate capacity of 42 Ah was constructed in the same manner as in Example 18.

Example 21

A hybrid negative plate of the invention was produced in the same manner as in Example 18 except that a zinc powder of 79 parts by weight (10 parts by weight in terms of Al) was added to the pasty carbon mixture as shown in Table 1. The porosity of the carbon mixture sheet of the hybrid negative plate was 77%. Next, using the hybrid negative electrode plate, a starter lead-acid storage battery having a 5 hour rate capacity of 42 Ah was constructed in the same manner as in Example 18.

Example 22

A hybrid negative plate of the invention was produced in the same manner as in Example 18 except that a zinc powder of 157.8 parts by weight (20 parts by weight in terms of Al) was added to the pasty carbon mixture as shown in Table 1. The porosity of the carbon mixture sheet of the hybrid negative plate was 88%. Next, using the hybrid negative plate, a starter lead-acid storage battery having a 5 hour rate capacity of 42 Ah was constructed in the same manner as in Example 18.

Example 23

A hybrid negative plate of the invention was produced in the same manner as in Example 18 except that a zinc powder of 165.7 parts by weight (21 parts by weight in terms of Al) was added to the pasty carbon mixture shown in Table 1. The porosity of the carbon mixture sheet of the hybrid negative plate was 88%. Next, using the hybrid negative plate, a starter lead-acid battery having a 5 hour rate capacity of 42 Ah was constructed in the same manner as in Example 18.

Example 24

A hybrid negative plate of the invention was produced in the same manner as in Example 18 except that an aluminum powder of 10 parts by weight were added to the pasty carbon mixture as shown in Table 1. The porosity of the carbon mixture sheet of the hybrid negative plate was 77%. Next, using the hybrid negative plate, a starter lead-acid storage battery having a 5 hour rate capacity of 42 Ah was constructed in the same manner as in Example 18.

Example 25

A hybrid negative plate of the invention was produced in the same manner as in Example 18 except that a camphor powder of 11.1 parts by weight (10 parts by weight in terms of Al) was added to the pasty carbon mixture as shown in Table 1. The porosity of the carbon mixture sheet of the hybrid negative plate was 77%. Next, using the hybrid negative electrode plate, a starter lead-acid storage battery having a 5 hour rate capacity of 42 Ah was constructed in the same manner as in Example 18.

Example 26

A hybrid negative plate of the invention was produced in the same manner as in Example 18 except that a naphthalene powder of 13.2 parts by weight (10 parts by weight in terms of Al) was added to the pasty carbon mixture as shown in Table 1. The porosity of the carbon mixture sheet of the hybrid negative plate was 77%. Next, using the hybrid negative plate, a starter lead-acid storage battery having a 5 hour rate capacity of 42 Ah was constructed in the same manner as in Example 18.

Example 27

A hybrid negative plate of the invention was produced in the same manner as in Example 18 except that a zinc powder of 79 parts by weight (10 parts by weight in terms of Al) and an aluminum powder of 10 parts by weight were added to the pasty carbon mixture as shown in Table 1. The porosity of the carbon mixture sheet of the hybrid negative plate was 86%. Next, using the hybrid negative plate, a starter lead-acid storage battery having a 5 hour rate capacity of 42 Ah was constructed in the same manner as in Example 18.

Example 28

A hybrid negative plate of the invention was produced in the same manner as in Example 18 except that a camphor powder of 11.1 parts by weight (10 parts by weight in terms of Al) and an aluminum powder of 10 parts by weight were added to the pasty carbon mixture as shown in Table 1. The porosity of the carbon mixture sheet of the hybrid negative plate was 86%. Next, using the hybrid negative plate, a starter lead-acid storage battery having a 5 hour rate capacity of 42 Ah was constructed in the same manner as in Example 18.

Example 29

A hybrid negative plate of the invention was produced in the same manner as in Example 18 except that a naphthalene powder of 13.2 parts by weight (10 parts by weight in terms of Al) and an aluminum powder of 10 parts by weight were added to the pasty carbon mixture as shown in Table 1. The porosity of the carbon mixture sheet of the hybrid negative plate was 86%. Next, using the hybrid negative plate, a starter lead-acid storage battery having a 5 hour rate capacity of 42 Ah was constructed in the same manner as in Example 18.

Example 30

A hybrid negative plate of the invention was produced in the same manner as in Example 18 except that a zinc powder of 26.3 parts by weight (3.33 parts by weight in terms of Al), a camphor powder of 3.7 parts by weight (3.33 parts by weight in terms of Al) and an aluminum powder of 3.33 parts by weight were added to the pasty carbon mixture as shown in Table 1. The porosity of the carbon mixture sheet of the hybrid negative plate was 77%. Next, using the hybrid negative plate, a starter lead-acid storage battery having a 5 hour rate capacity of 42 Ah was constructed in the same manner as in Example 18.

Example 31

A hybrid negative plate of the invention was produced in the same manner as in Example 18 except that a zinc powder of 26.3 parts by weight (3.33 parts by weight in terms of Al), a naphthalene powder of 4.4 parts by weight (3.33 parts by weight in terms of Al) and an aluminum powder of 3.33 parts by weight were added to the pasty carbon mixture as shown in Table 1. The porosity of the carbon mixture sheet of the hybrid negative plate was 77%. Next, using the hybrid negative plate, a starter lead-acid storage battery having a 5 hour rate capacity of 42 Ah was constructed in the same manner as in Example 18.

Example 32

A hybrid negative plate of the invention was produced in the same manner as in Example 18 except that a zinc powder of 26.3 parts by weight (3.33 parts by weight in terms of Al), a camphor powder of 3.7 parts by weight (3.33 parts by weight in terms of Al) and a naphthalene powder of 4.4 parts by weight (3.33 parts by weight in terms of Al) were added to the pasty carbon mixture as shown in Table 1. The porosity of the carbon mixture sheet of the hybrid negative plate was 77%. Next, using the hybrid negative plate, a starter lead-acid storage battery having a 5 hour rate capacity of 42 Ah was constructed in the same manner as in Example 18.

Next, for the starter lead-acid storage batteries produced in the above Examples 19 to 32, a quick discharge test at a low temperature of −15° C. according to JIS D 5031 was conducted, and the voltage after 5 seconds, the voltage after 30 seconds and the discharge duration time were measured. Namely, each of the starter lead-acid storage batteries as above was put in a thermostat bath of −15° C. and was left for 15 hours, and thereafter was discharged at a current of 210 A until the cell voltage was lowered to 1.0V, and the 5 second voltage at discharge, the 30 second voltage at discharge and the discharge duration time were measured. The results are shown in Table 7 below.

TABLE 7

Results of Quick Discharge Test at Low Temperature

|  | 5 Second Voltage (V) | 30 second Voltage (V) | Duration Time (sec) |
| --- | --- | --- | --- |
| Example 18 | 1.46 | 1.42 | 73 |
| Example 19 | 1.51 | 1.47 | 81 |
| Example 20 | 1.52 | 1.48 | 82 |
| Example 21 | 1.55 | 1.52 | 87 |
| Example 22 | 1.56 | 1.54 | 88 |
| Example 23 | 1.57 | 1.54 | 88 |
| Example 24 | 1.57 | 1.54 | 88 |
| Example 25 | 1.54 | 1.51 | 86 |
| Example 26 | 1.54 | 1.51 | 86 |
| Example 27 | 1.58 | 1.55 | 91 |
| Example 28 | 1.57 | 1.54 | 90 |
| Example 29 | 1.57 | 1.54 | 90 |
| Example 30 | 1.59 | 1.56 | 92 |
| Example 31 | 1.59 | 1.56 | 92 |
| Example 32 | 1.57 | 1.55 | 91 |
| Comparison Example 2 | 1.39 | 1.31 | 47 |

As clear from Table 7, the starter lead-acid storage batteries provided with the hybrid negative plates produced in Examples 19 to 32 of the invention exhibits extremely excellent in the low temperature discharge characteristics as compared with the starter lead-acid storage battery provided with the hybrid negative plate produced in Comparison Example 2. It is considered that this result is caused by that supply of sulfuric acid to the surface of the negative plate is facilitated by the pore forming agent in the carbon mixture to improve the low temperature discharge characteristics.

Further, because the conventional starter lead-acid storage battery has such a problem that the carbon mixture layer coated on the negative plate of the hybrid negative plate is peeled by gas generated during formation, the hybrid negative plate has to be compressed by the composite separator comprising the polyethylene separator and the nonwoven fabric laminated to the surface of the polyethylene separator in order to prevent the carbon mixture layer from peeling. In contract thereto according to the present invention, the carbon mixture sheet itself adhered to the entire surface of the negative plate acts as prevention also from peeling, and accordingly, the separator is sufficient with the polyethylene separator alone.

INDUSTRIAL APPLICABILITY

As described in the above, according to the present invention, the hybrid negative plate produced by adhering a carbon mixture sheet to the surface of the negative plate brings about improvement in the performance and productivity thereof and the lead-acid storage battery provided with the hybrid negative plate of the invention is applicable to hybrid vehicles and idling-stop vehicles which are prospective in expansion of application and which are used under repetition of quick charge-discharge under PSOC or at low temperatures, and further the lead-acid battery is applicable to other industrial fields of windmills or photovoltaic generation or the like, and excellent performance and productivity are brought about.

The invention claimed is:
1. A method for producing a hybrid negative plate for a lead-acid storage battery comprising the steps of:
   (i) preparing a carbon mixture comprising a first carbon material having electroconductivity and a second carbon material having capacitor capacitance and/or pseudocapacitor capacitance, and a binder;
   (ii) forming the carbon mixture into a sheet;
   (iii) preparing a negative active material-filled plate comprising a current collector plate coated with negative active battery material;
   (iv) applying said carbon mixture sheet prepared in step (ii) to the negative active material-filled plate of step (iii) when the plate is in a wet state to form a hybrid negative plate;
   (v) roll pressing the hybrid negative plate formed in step (iv); and
   (vi) after step (v), drying the hybrid negative plate.
2. The method for producing a hybrid negative plate for a lead-acid storage battery according to claim 1, wherein the method comprises drying the carbon mixture sheet before applying the carbon mixture sheet to the negative active material-filled plate.
3. The method for producing a hybrid negative plate for a lead-acid storage battery according to claim 1, wherein the applying of the carbon mixture sheet to the negative active material-filled plate in step (iv) is performed when the sheet is in a wet state.
4. The method for producing a hybrid negative plate for a lead-acid storage battery according to claim 1, wherein the carbon mixture is formed into a sheet by an extrusion forming method or a coating method.
5. The method for producing a hybrid negative plate for a lead-acid storage battery according to claim 4, wherein the coating method comprises applying the carbon mixture to a porous sheet.
6. The method for producing a hybrid negative plate for a lead-acid storage battery according to claim 1, wherein after the step of applying the carbon mixture sheet to the negative active material-filled plate, pressure is applied to the hybrid negative plate to facilitate adherence between the sheet and plate.

7. The method for producing a hybrid negative plate for a lead-acid storage battery according to claim 1, wherein the carbon mixture contains the first carbon material in an amount of 5 and 70 parts by weight of the total weight of the carbon mixture.

8. The method for producing a hybrid negative plate for a lead-acid storage battery according to claim 1, wherein the carbon mixture contains the first carbon material in an amount of 10 and 60 parts by weight of the total weight of the carbon mixture.

9. The method for producing a hybrid negative plate for a lead-acid storage battery according to claim 1, wherein the carbon mixture contains the second carbon material in an amount of 20 and 80 parts by weight of the total weight of the carbon mixture.

10. The method for producing a hybrid negative plate for a lead-acid storage battery according to claim 9, wherein the carbon mixture contains the second carbon material in an amount of 30 and 70 parts by weight of the total weight of the carbon mixture.

11. The method for producing a hybrid negative plate for a lead-acid storage battery according to claim 1, wherein the carbon mixture comprises a pore forming agent.

12. The method for producing a hybrid negative plate for a lead-acid storage battery according to claim 11, wherein the pore forming agent is at least one selected from the group of a zinc powder, a camphor powder, a naphthalene powder and aluminum powder.

13. The method for producing a hybrid capacitor negative plate for a lead-acid storage battery according to claim 11, wherein the pore forming agent is aluminum.

14. The method for producing a hybrid capacitor negative plate for a lead-acid storage battery according to claim 13, wherein the aluminum is provided in an amount of 3 to 20 parts by weight of the total weight of the carbon mixture.

15. The method for producing a hybrid capacitor negative plate for a lead-acid storage battery according to claim 14, wherein the aluminum is provided in an amount of 5 to 15 parts by weight of the total weight of the carbon mixture.

16. The method for producing a hybrid capacitor negative plate for a lead-acid storage battery according to claim 1, wherein the binder is provided in an amount of less than 10 parts by weight of the total weight of the carbon mixture.

17. The method for producing a hybrid negative plate for a lead-acid storage battery according to claim 1, wherein the carbon mixture comprises a short fiber reinforcing material.

18. The method for producing a hybrid negative plate for a lead-acid storage battery according to claim 17, wherein the short fiber reinforcing material comprises individual fibers having dimensions between 1 to 30 μm in thickness and 0.05 to 4.0 mm in length.

19. A lead-acid storage battery provided with the hybrid negative plate produced by the method according to claim 1.

20. The method for producing a hybrid negative plate for a lead-acid storage battery according to claim 1, wherein the carbon mixture comprises a mixed amount of from 5 to 70 parts by weight of the first carbon material, from 20 to 80 parts by weight of the second carbon material, from 1 to 20 parts by weight of the binder and a thickener in an amount of less than 10 parts by weight.

* * * * *